United States Patent [19]
Otto

[11] Patent Number: 5,014,122
[45] Date of Patent: May 7, 1991

[54] METHOD AND APPARATUS FOR ENCODING AND TRANSMISSION OF VIDEO SIGNALS

[75] Inventor: Detlev Otto, Knoxville, Tenn.

[73] Assignee: North American Philips Corporation, New York, N.Y.

[21] Appl. No.: 377,365

[22] Filed: Jul. 7, 1989

[51] Int. Cl.$^5$ .................... H04N 11/00; H04N 11/08
[52] U.S. Cl. ........................................ 358/12; 358/14
[58] Field of Search .................... 358/12, 14

[56] References Cited

U.S. PATENT DOCUMENTS

| | | | |
|---|---|---|---|
| 3,793,478 | 2/1974 | Verhoeven | 358/12 |
| 3,813,483 | 5/1974 | Kurosawa et al. | 358/408 |
| 4,473,837 | 9/1984 | Tiemann | 358/12 |

FOREIGN PATENT DOCUMENTS

| | | | |
|---|---|---|---|
| 134692 | 7/1985 | Japan | 358/12 |
| 208191 | 10/1985 | Japan | 358/12 |

OTHER PUBLICATIONS

Charles W. Rhodes, Time Division Multiplexing of Time Compressed Chrominance for a Compatible High Definition Television System, IEEE Transactions on Consumer Electronics, vol CE-28, No. 4, Nov. 1982, pp. 592-602.

William F. Schreiber, 6 mHz Single-Channel HDTV Systems, HDTV Symposium, Ottawa, Oct. 1987.

Fukinuki et al., Extended Definition TV Fully Compatible with Existing Standards, IEEE Transactions on Communications, vol. COM-32, No. 8, Aug. 1984, pp. 948-953.

*Primary Examiner*—John W. Shepperd
*Attorney, Agent, or Firm*—Edward W. Goodman

[57] ABSTRACT

A method for encoding and transmitting video signals, the method including separating the video signals into consecutive base intervals, each base interval having a predetermined time duration; time delaying every other one of the base intervals for the predetermined time duration whereby consecutive pairs of the base intervals are available in parallel; time expanding by a factor of two each of the consecutive pairs of base intervals thereby reducing the bandwidth of the intervals by one-half; and amplitude modulating in quadrature the base intervals in the time expanded consecutive pairs of base intervals onto a carrier frequency located in a transmission band.

5 Claims, 5 Drawing Sheets

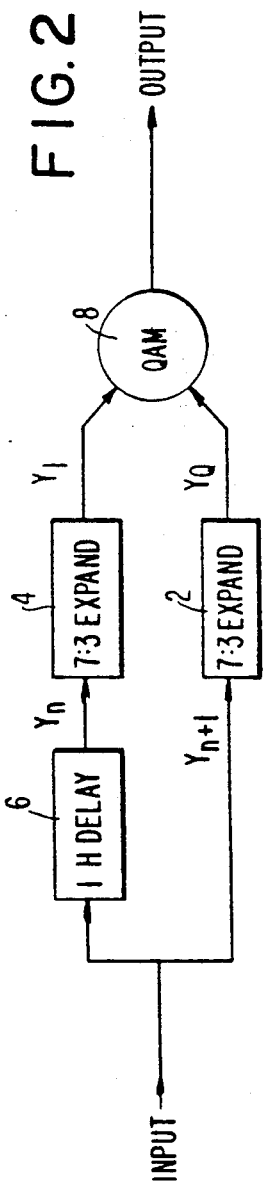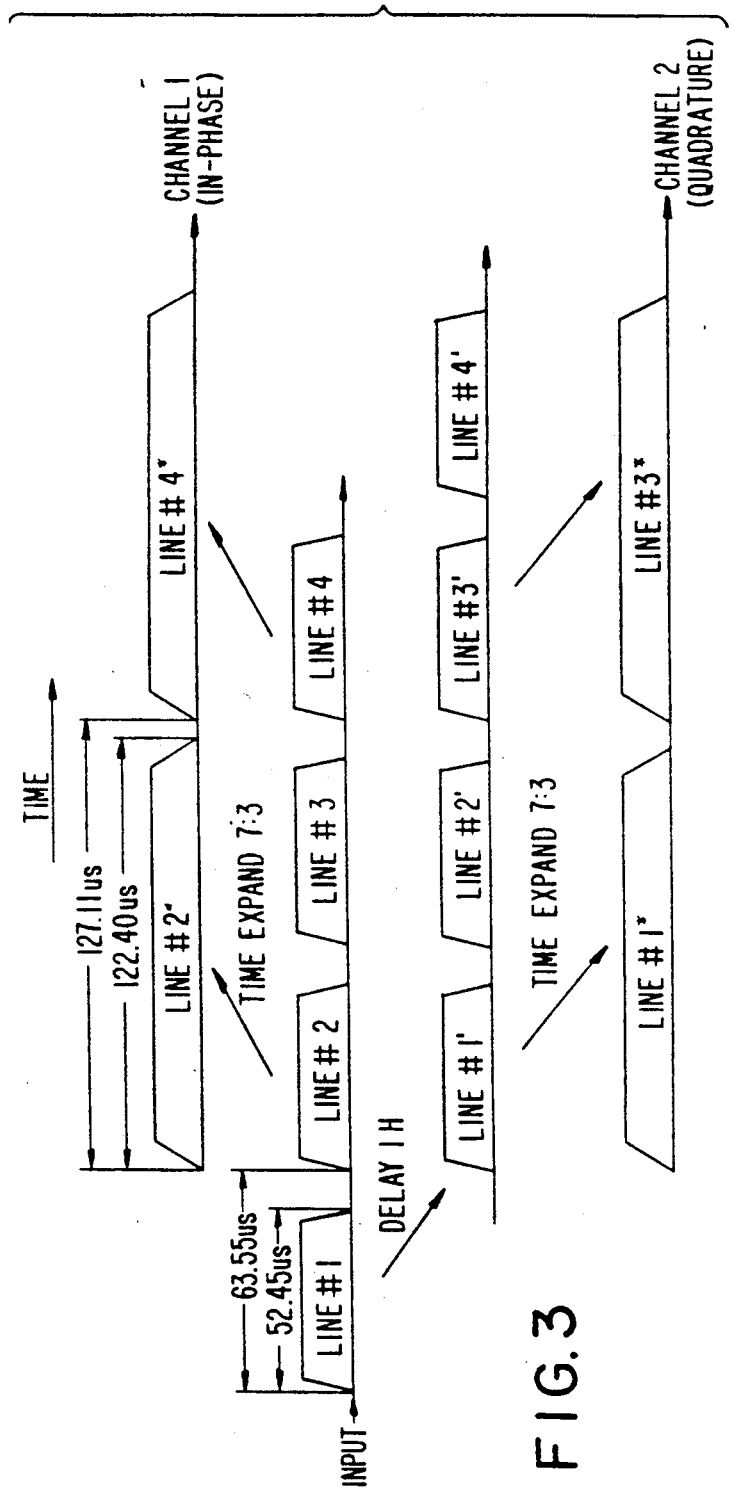

METHOD AND APPARATUS FOR ENCODING AND TRANSMISSION OF VIDEO SIGNALS

BACKGROUND OF THE INVENTION

1. Field of the Invention

The subject invention relates to the encoding of video signals enabling the transmission thereof over standard terrestrial and cable broadcast channels.

2. Description of Related Art

Color television signals are currently being transmitted to consumers in accordance with one of several television transmission standards, for example, NTSC and PAL. These standards prescribe various characteristics of the transmission signal, i.e., 525 or 625 scanning lines presented in two consecutive, interlaced fields forming each picture frame at a field rate of 60 (or more precisely 59.94) or 50 Hz, to be transmitted over a transmission channel having a bandwidth of at most 6 MHz.

Over the last few years, there has been increased interest in improving the quality of the received television picture. One of these areas is improving the horizontal and vertical resolution of the television signal. Another area is to change the aspect ratio from a standard ratio of 4:3 to a wide-screen ratio of 16:9. A benefit of this wide-screen ratio is that it is substantially similar to the aspect ratio used in preparing motion pictures. Therefore, it would no longer be necessary to clip side portions of the picture in order to present the same on television. Another of these areas is an improvement in the quality of the audio signal accompanying the transmission.

A common problem in each of the above areas of improvement is that, without special encoding, bandwidth in excess of the above prescribed 6 MHz is required.

SUMMARY OF THE INVENTION

An object of the present invention is to provide a method and apparatus for encoding television signals enabling the transmission of a wide-screen video signal on a standard television channel.

This object is achieved in an apparatus for encoding and transmitting video signals comprising means for dividing the video signals into consecutive intervals, each interval having a predetermined time duration; means coupled to an output of the dividing means for time delaying every other one of the intervals for the predetermined time interval, the time delaying means having first and second outputs for providing the delayed and undelayed intervals, respectively, in parallel; first and second expanding means coupled to the first and second outputs, respectively, of the time delaying means for time expanding by a factor of two each of the intervals thereby reducing the bandwidth of the intervals by one-half; and means coupled to outputs of the first and second time expanding means for amplitude modulating in quadrature the intervals at the outputs of the first and second time expanding means onto a carrier frequency located in the middle of a transmission band.

Since the video signals are conveniently in the form of scanning lines, it is advantageous that the consecutive intervals be the scanning lines and the predetermined time interval be the time duration of each of the scanning lines.

A further object of the invention is to eliminate distortions in the image presentation, for example cross color and cross luminance, which are present in displaying video signals in accordance with the above standards.

This further object is achieved in the above apparatus further including means for receiving the video signals and for separately providing luminance and chrominance components, included in the video signals, at respective outputs thereof, the time delaying means being coupled to receive the luminance component; means coupled to an output of the matrix means for suppressing alternate intervals of the chrominance component corresponding, in time, to the intervals of the luminance component to be delayed in the time delaying means; third expanding means coupled to an output of the suppressing means for expanding the unsuppressed chrominance component by a factor of 7:3; means for combining the luminance component at the output of the second time expanding means with the chrominance component at an output of the third time expanding means, wherein the amplitude modulation in quadrature means is coupled to the output of the first time expanding means and an output of the combining means; and means for bandwidth limiting the luminance component at the output of the second expanding means, whereby the bandwidth limited luminance component and the chrominance component are separated from each other in frequency.

In order to improve the audio signal associated with the video signals, the subject invention contemplates quadrature modulating two digital audio signal about the same carrier as the video signals and then transmitting the resulting modulated signal during the vertical blanking periods of the video signal.

BRIEF DESCRIPTION OF THE DRAWINGS

With the above and additional objects and advantages in mind as will hereinafter appear, the invention will be described with reference to the accompanying drawings, in which:

FIG. 2 shows a simplified block diagram depicting the principle of the invention;

FIG. 3 shows the timing of signal waveforms occurring in the diagram of FIG. 2;

FIG. 4a shows the frequency spectrum for the signal produced in the in-phase channel, while

DESCRIPTION OF THE PREFERRED EMBODIMENT

Figure 1A:
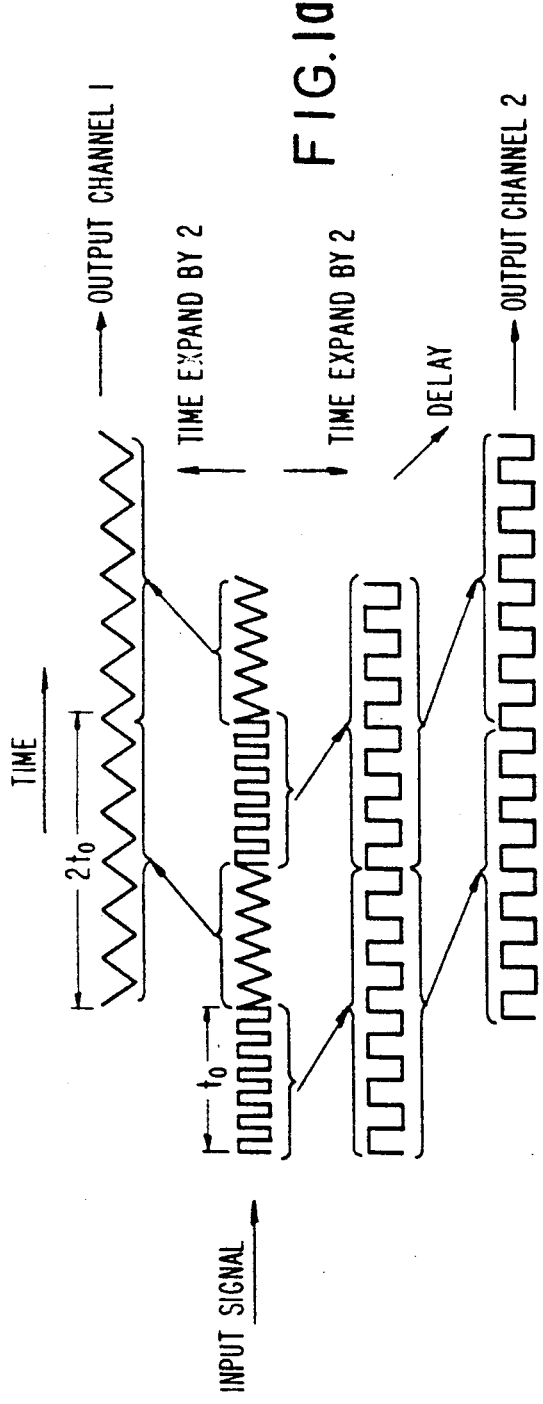
FIGS. 1a and 1b are signal diagrams showing the principles of the encoding of the subject invention in the time domain and the frequency domain.
Figure 1B:
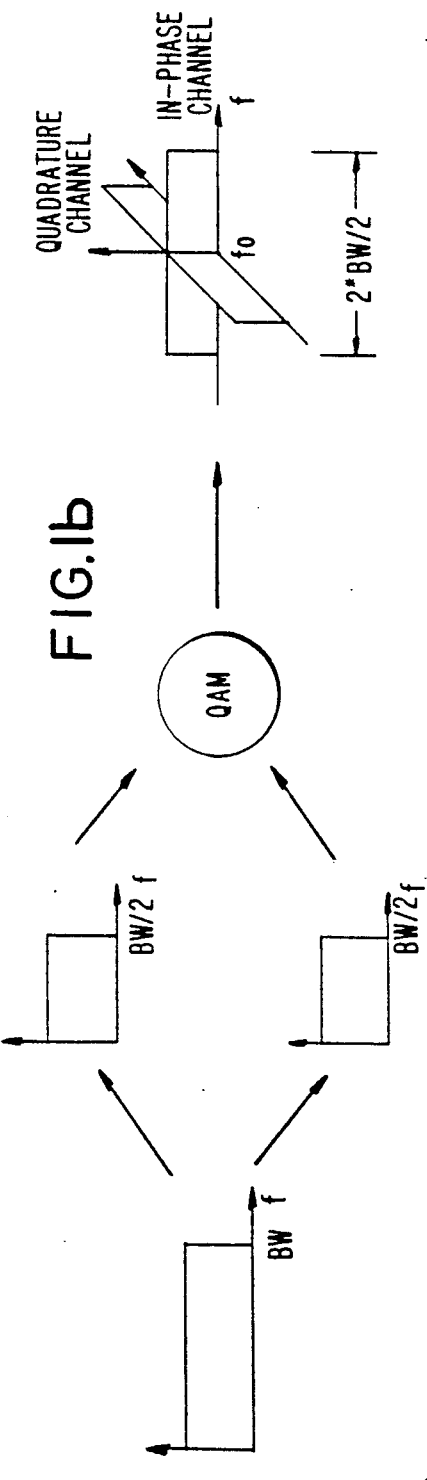
Figure 4A:
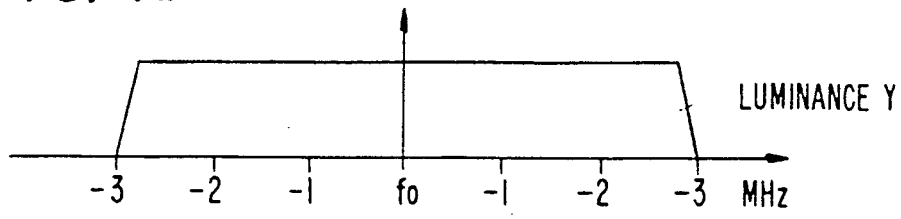
Figure 4B:
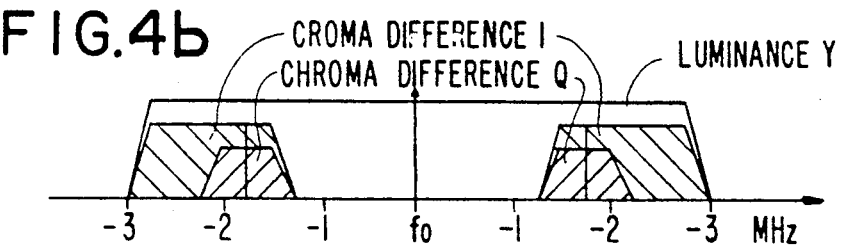
FIGS. 4b–4d show alternative embodiments of the frequency spectrum produced in the quadrature channel.
Figure 4C:
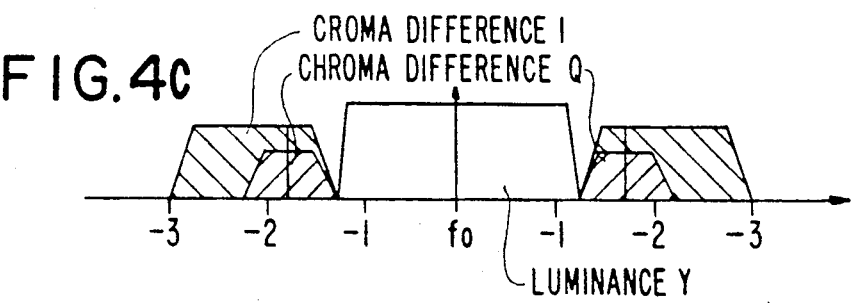
Figure 4D:
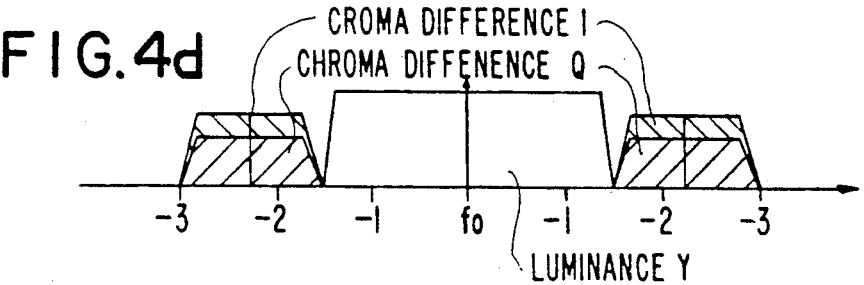

The basic idea of the subject invention, as illustrated in FIGS. 1a and 1b, is to separate a signal, continuous in time with a bandwidth of BW, into intervals I(n), where n = 1, 2, 3, . . . , each interval having a time duration of t(0). Each interval is then time expanded by a factor of two to 2*t(0), resulting in a bandwidth reduction to BW/2. Alternate intervals are then delayed by t(0) with respect to the intervening intervals. Accordingly, two consecutive intervals I(n) and I(n+1), where n = 1, 3, 5, . . . , are available in parallel and are amplitude modulated in quadrature onto a carrier located in the center of the transmission band. The quadrature modulation allows the transmission of two essentially independent signals which compensates for the time expansion applied to the signal beforehand. Since amplitude modulation is used, the signal may have a DC content, which makes this principle suitable for television signals.

For the purpose of describing the subject invention, it will be assumed that the input television signal is in conformance with the NTSC transmission standard, with the exception that the aspect ratio of the displayed picture is 16:9. However, it should be understood that the subject invention is not limited to this video format.

When applying the subject encoding scheme to video signals, a convenient interval I(n) is one scanning line. In addition, since in the standard NTSC format, the vertical blanking time amounts to 42 out of every 525 scanning lines, this period may be used for transmitting two high quality digital audio channels.

In FIG. 2, the basic signal processing path for the luminance signal is shown, while in FIG. 3, timing signal diagrams depicting this process are shown. It should be understood that a similar processing is carried out on the chrominance signal. The incoming luminance signal Y is split into two parts, one part, Y(n+1), is applied directly to a first time-expansion circuit 2, while the other part, Y(n), is applied to a second time-expansion circuit 4 via a delay 6 having a delay time of 1 H (63.55 us for NTSC). As noted above, the subject invention proposes to time expand the intervals by a factor of two. Since the active video portion of each scanning line occupies 52.45 us out of the 63.55 us line duration, a factor of 7:3 is chosen for time expansion resulting in an active video time of 52.45*(7:3)=122.40 us. Since the overall line time due to a 2:1 time expansion is 127.11, this leaves 4.71 us for line blanking and chroma burst.

Both expanded components Y(I) and Y(Q) are now modulated in quadrature in modulator 8 onto the same carrier allowing a bandwidth of two times one-half of the original bandwidth (double sideband quadrature amplitude modulation), centered around the carrier in the middle of the transmission band. During the vertical blanking time, the same quadrature modulator 8 may be used for digital modulation, when driven from two bipolar digital signals of 6 MBits/s each, the resulting modulation being quadrature phase shift keying (QPSK) around the same carrier.

The above process allows for the insertion of the chrominance signal in a manner similar to that in the NTSC standard. However, applicant has noticed that since the characteristics of the human visual system cannot resolve high vertical and horizontal detail at the same time, one can be traded off against the other, and that the human visual system cannot resolve chrominance detail to the same extent as luminance detail. Hence, the subject invention contemplates transmitting the chrominance information every other line, reducing the luminance bandwidth every other line, and using the spectrum freed by this band-limiting process to transmit the chrominance for complete luminance/chrominance separation.

FIG. 4 shows different possibilities as to how the spectral distribution of the two channels (in-phase and quadrature), prior to being modulated, may be realized. In particular, FIG. 4a shows the frequency spectrum of the in-phase channel which, in this example, does not contain the chrominance information. In FIG. 4b, both chrominance signals I and Q are modulated in quadrature onto a subcarrier at one-half of the NTSC chrominance subcarrier frequency f(sc)/2 and are spectrally interleaved with the luminance spectrum as in the NTSC standard. In FIG. 4c, the chrominance signals are arranged as in FIG. 4b, however, the luminance signal is low-pass filtered thereby resulting in complete luminance/chrominance separation. FIG. 4d is similar to FIG. 4c, with the exception that the chrominance subcarrier is chosen for symmetrical and equal chrominance spectra for both I and Q.

Figure 5:
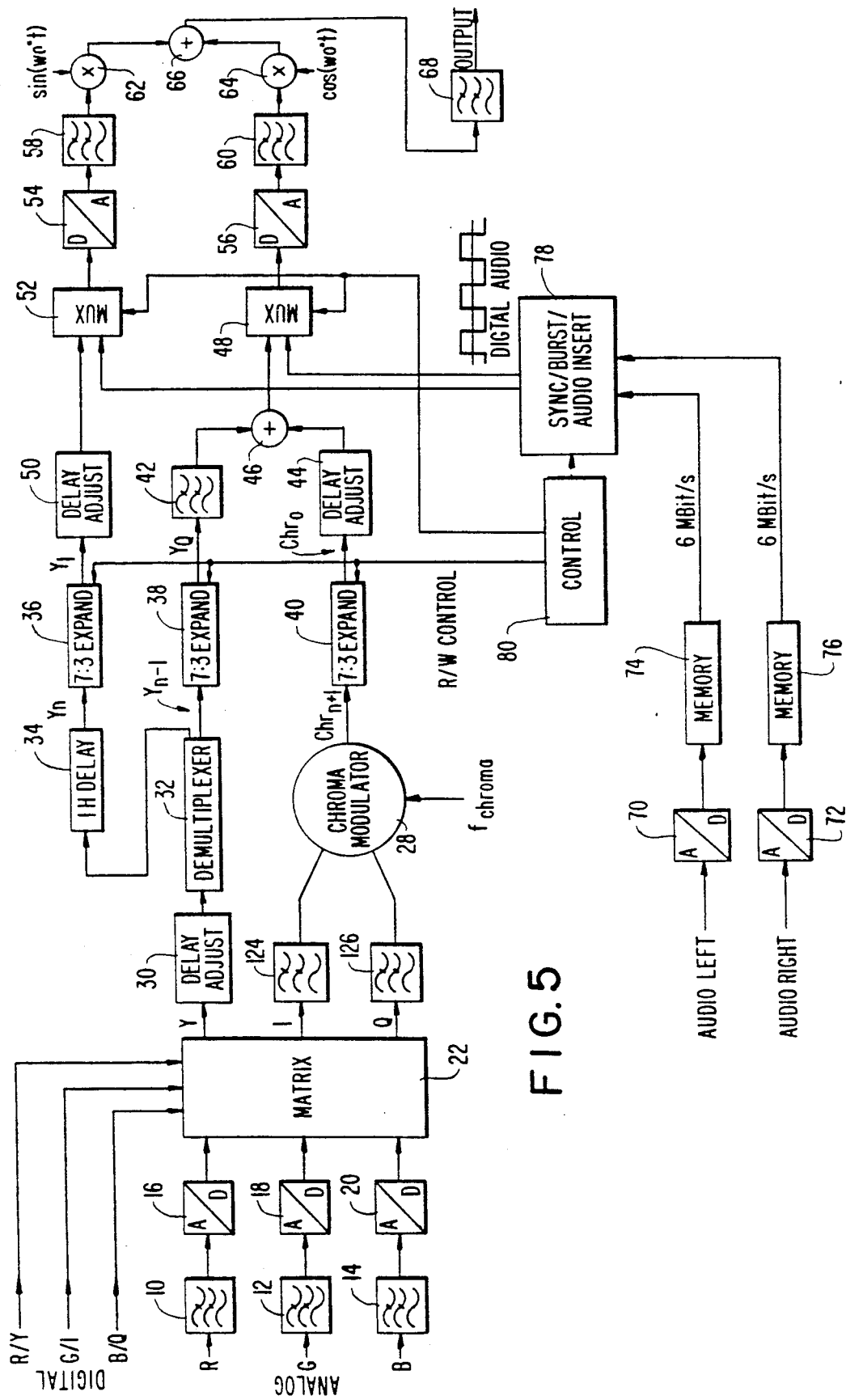
FIG. 5 shows a block diagram of an encoder embodying the subject.

FIG. 5 shows an embodiment of a widescreen encoder incorporating the principles of the invention. A video source provides the signal representing an image scanned by use of the interlace scanning technique. For convenience, a field rate of 59.94 Hz, 525 scanning lines per frame from a 16:9 image is chosen. It should also be understood that the principles of the subject invention are applicable to different scanning rates and aspect ratios.

The input RGB signals are low-pass filtered in low-pass filters 10, 12 and 14 to remove alias components, and are then digitized in A/D converters 16, 18 and 20, and are then transformed into luminance and color difference signals Y, I and Q in matrix circuit 22. Matrix circuit 22 includes a built-in multiplexer enabling the use of digital RGB and/or YIQ signals. The I and Q color difference signals are bandwidth limited to 1.78 MHz by low-pass filters 24 and 26 and are then modulated in quadrature in modulator 28 onto a subcarrier of 5.204 MHz ((567/2)*7/3 f(h)'), resulting in the signal designated Chr(n+1). A delay adjust unit 30 in the luminance path ensures timing alignment. This time adjusted luminance signal is applied to a demultiplexer 32 which switches at the line frequency. A first output of the demultiplexer 32 is applied to a 1 H delay unit 34. The output of the delay unit 34, the second output of the demultiplexer 32 and the output of the modulator 28 are applied to respective 7:3 time expansion circuits 36, 38 and 40, the respective outputs being designated Y(I) for the in-phase channel, and Y(Q) and Chr(Q) for the quadrature phase channel. The Y(Q) signal is optionally applied to a low-pass filter 42 for providing the luminance/chrominance separation discussed above. The Chr(Q) is, in this event, applied to a delay adjust unit 44 and the outputs of the low-pass filter 42 and the delay adjust unit 44 are added in adder 46 and applied to a first input of a multiplexer 48. The expanded Y(I) signal at the output of time expansion circuit 36 is applied to a delay adjust unit 50 and is then applied to a multiplexer 52. The multiplexers 48 and 52 allow for the insertion of synchronization and chroma burst signals into each line and the insertion of digital audio signals into the field blanking periods. The outputs of the multiplexers 48 and 52 are applied to respective D/A converters 54 and 56, the outputs from which being low-pass filtered in low-pass filters 58 and 60. The signals therefrom are applied to a quadrature modulator formed by a pair of multipliers 62 and 64 respectively multiplying the output signals of low-pass filters 58 and 60 by two signals of the frequency f(0) but with a phase difference of 90 degrees (sin(wo*t), cos(wo*t)). The outputs of the multipliers 62 and 64 are added in adder 66, and the resulting sum signal is filtered in bandpass filter 68 to suppress out-of-band signals, the final signal to be transmitted being available at the output of the bandpass filter 68.

The analog audio information from both the left and right channels are converted in A/D converters 70 and 72 and are written in respective memories 74 and 76.

The contents of the memories 74 and 76 are serially read out at a data rate of 6 MBits/s during the vertical blanking interval and are applied to a sync/burst/audio insertion block 78, outputs of which are respectively connected to the second inputs of multiplexers 48 and 52. The sync/burst/audio insertion circuit 78 generates the necessary reference signals for synchronization and chroma phase and adds these reference signals to each line of the video signal and to the audio signals before they are applied to the quadrature modulator. The choice of a bipolar signal format results in quadrature phase shift keying (QPSK) modulation for the digital signals in the quadrature modulator without any modifications of the modulator. A controller 80 provides timing signals for the demultiplexer 32, the time expansion circuits 36, 38 and 40, the multiplexers 48 and 52, and the sync/burst/audio insertion circuit 78.

Due to the use of DSB amplitude modulation, it is possible to make use of the direct conversion principle for receiving purposes, in that the modulated signal is heterodyned immediately to baseband without any intermediate steps and frequencies. All selectivity is provided at baseband with low-pass filters avoiding expensive IF filtering.

Figure 6:
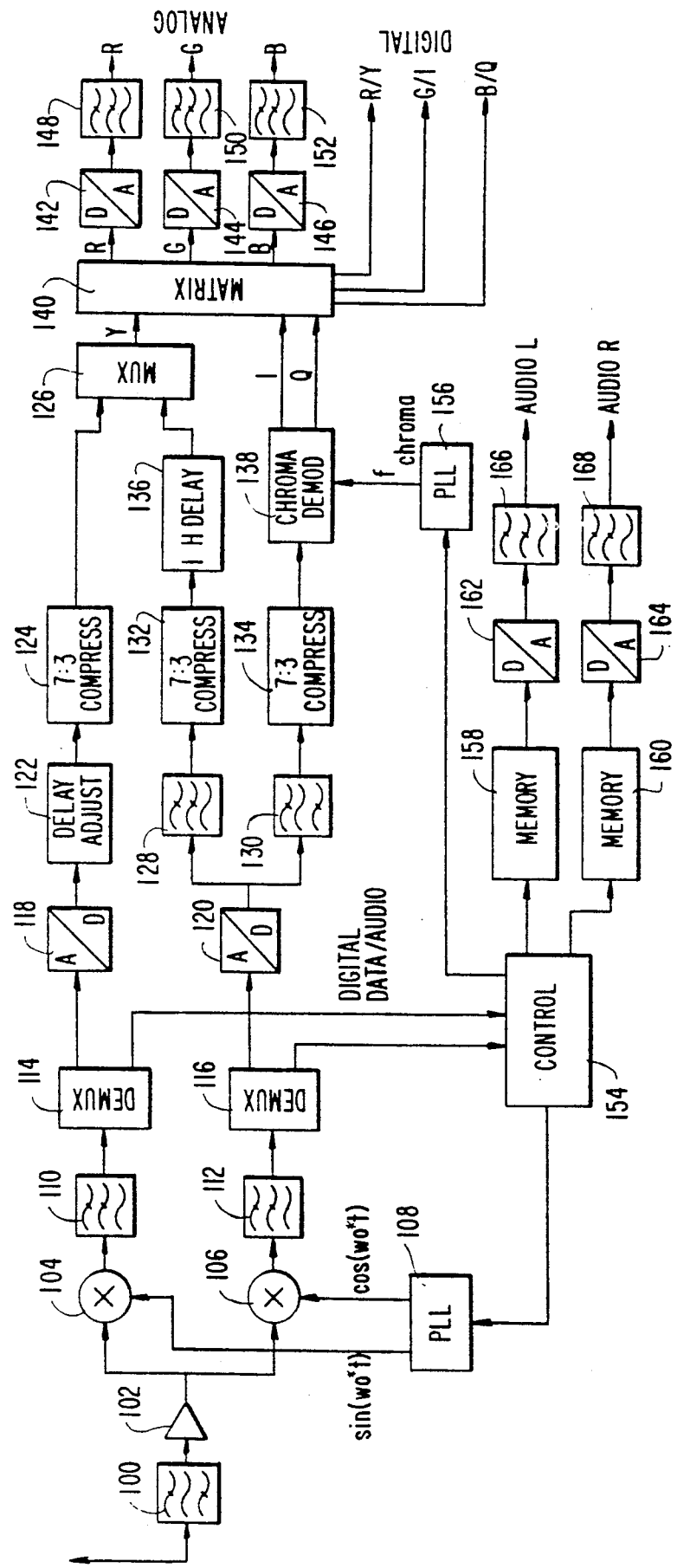
FIG. 6 shows a block diagram of a decoder for use in a wide-screen television receiver for the signal encoded by the encoder of FIG. 5.

FIG. 6 shows a block digram of a widescreen decoder for decoding the signals transmitted by the above described widescreen encoder. In particular, the transmitted signal is applied to a bandpass filter 100, the output of which is amplified in an amplifier 102 and applied to a quadrature demodulator consisting of two mixers 104 and 106 which are driven by two signals of the frequency f(0), which is equal to the carrier frequency of the signal to be received, with a phase difference of 90 degrees. These two signals, sin(wo*t) and cos(wo*t), are determined by a phase-locked loop circuit 108 using the sync and burst information of the incoming signal.

At the outputs of the mixers 104 and 106, both the in-phase and quadrature signals are available. These signals are applied to low-pass filters 110 and 112 which reject unwanted out-of-band signals and noise and prove the required selectivity. Two demultiplexers 114 and 116 split the two signals into video and digital data/sync information. The video signals are digitized in A/D converters 118 and 120. The in-phase signal from A/D converter 118, which contains luminance information only, is applied through a delay adjust unit 122 to a 7:3 time compression circuit 124 and then to a first input of a multiplexer 126. The quadrature signal from A/D converter 120, which contains the separated luminance and chrominance signals, is applied to a diplexer consisting of a low-pass filter 128 and a bandpass filter 130, the outputs of which being applied to respective 7:3 time compression circuits 132 and 134, after which the output of the time compression circuit 132 containing the luminance signal is applied via a 1 H delay unit 136 to the other input of multiplexer 126, while the output of the time compression circuit 134 is applied to a chrominance decoder 138. If the luminance and chrominance signals in the quadrature signal are not separated but are combined in the standard manner, a standard Y/C separation circuit may be used instead of the diplexer 128 and 130.

Since the chrominance information is being transmitted only every other line, the chrominance decoder 138 includes an interpolation circuit for interpolating the chrominance information for the intervening lines, and provides color difference signals at its outputs. These outputs along with the output of the multiplexer 126 are applied to a matrix circuit 140 which has a first set of outputs for directly providing digital RGB/YIQ signals and a second set of outputs for providing the digital RGB signals which are converted in D/A converters 142, 144 and 146 and then low-pass filtered in low-pass filters 148, 150 and 152, the outputs of these filters providing the output of the decoder.

The digital data/sync information from the demultiplexers 114 and 116 are applied to a control circuit 154 which provides the reference signals for the phase-locked loop circuit 108 and for a second phase-locked loop circuit 156 providing the reference signal for the chrominance decoder 138. The control circuit 154 further applies the digital audio signals from respective second outputs of demultiplexers 114 and 116 to memories 158 and 160 at the received data rate of 6 Mb/s each. The data is read out at its lower original data rate to form two continuous signals which are applied to D/A converters 162 and 164 and to low-pass filters 166 and 168 which provide the analog left and right audio signals.

It should be noted that the term "transmission" as used herein encompasses broadcasting, recording, wire transmission, and any other means for transferring information from one time and/or place to another.

Numerous alterations of the structure herein disclosed will suggest themselves to those skilled in the art. However, it is to be understood that the described embodiment is for purposes of illustration only and not to be construed as a limitation of the invention. All such modifications which do not depart from the spirit of the invention are intended to be included within the scope of the appended claims.

What is claimed is:

1. A method for encoding and transmitting video signals, said video signals comprising consecutively arranged scanning lines forming a picture frame, said scanning lines having an active video portion having a time duration less than the time duration of said scanning line, and said active video portion including a luminance component and at least one chrominance component, said method comprising the steps:

separating said video signals into consecutive base intervals, each base interval having a predetermined time duration, wherein said base intervals comprise said scanning lines and said predetermined time duration comprises the time duration of each of said scanning lines;

time delaying every other one of said base intervals for said predetermined time duration whereby consecutive pairs of said base intervals are available in parallel;

suppressing said chrominance component in respective ones of said base intervals in said consecutive pares of base intervals;

time expanding by a factor of two each of said consecutive pairs of base intervals thereby reducing the bandwidth of said base intervals by one-half, said time expanding of said base intervals being performed by time expanding by a factor of 7:3 said active video portion of each of said scanning lines; and amplitude modulating in quadrature the base intervals in each of said time expanded consecutive pairs of base intervals onto a carrier having a frequency located in a transmission band.

2. A method as claimed in claim 1, wherein prior to said time expanding step, said method further comprises bandwidth limiting the luminance component in respective other ones of said base intervals in said consecutive pairs of base intervals, whereby said bandwidth limited luminance component and said chrominance component are separated from each other in frequency.

3. An apparatus as claimed in claim 4, wherein said apparatus further comprises means for bandwidth limiting the luminance component at the output of said second expanding means, whereby said bandwidth limited luminance component and said chrominance component are separated from each other in frequency.

4. An apparatus for encoding and transmitting video signals, said video signals comprising consecutively arranged scanning lines forming a picture frame, said scanning lines each having an active video portion having a time duration less the time duration of said scanning lines and including a luminance component and at least one chrominance component, said apparatus comprising:

means for dividing said video signals into consecutive base intervals, each base interval having a predetermined time duration, wherein said consecutive base intervals are said scanning lines and said predetermined time duration being the time duration of each of said scanning lines;

matrix means coupled to said dividing means for separately providing said luminance and chrominance components at respective outputs thereof;

means, coupled to the luminance output of said matrix means, for time delaying every other one of the base intervals of the luminance component for said predetermined time duration such that consecutive two base intervals of the luminance component appear simultaneously;

first and second means, coupled to the time delaying means, for time expanding the pairs of base intervals by a factor of two thereby reducing the bandwidth thereof, said first and second time expanding means performing said factor of two expansion by expanding the active video portion of each of said scanning lines of the luminance component by a factor of 7:3;

means, coupled to the chrominance output of said matrix means, for suppressing alternate base intervals of said chrominance component corresponding, in time, to said base intervals of said luminance component being delayed in said time delaying means;

third means, coupled to an output of said suppressing means, for time expanding the active video portion of each of the scanning lines of said unsuppressed chrominance component by a factor of 7:3;

means for combining the luminance component at the output of said second time expanding means with the chrominance component at an output of said third time expanding means; and means for amplitude modulating in quadrature each time the signals at the output of said combining means and at the output of said first time expanding means onto a carrier having a frequency located in a transmission band.

5. An apparatus for decoding video signals encoded in accordance with said encoding apparatus as claimed in claim 3, wherein said decoding apparatus comprises:

means for receiving said encoded video signals;

means for quadrature demodulating said video signals forming an in-phase and a quadrature signal;

first compressing means for compressing said in-phase signal by a factor of 7:3;

means for separating said luminance signal from said chrominance signal in said quadrature signal;

second compressing means for compressing said luminance signal by a factor of 7:3;

delaying means for delaying said compressed luminance signal for a period of one line interval;

multiplexing means coupled to said first compressing means and said delaying means for alternately providing the output signals therefrom as a combined luminance signal;

third compressing means for compressing said chrominance signal by a factor of 7:3; and matrix means coupled to said multiplexing means and said third compressing means for providing reconstituted video signals.

* * * * *